US010859242B2

(12) United States Patent
McLaughlin, III et al.

(10) Patent No.: US 10,859,242 B2
(45) Date of Patent: Dec. 8, 2020

(54) DOWNLIGHT FOR CEILING SYSTEM

(71) Applicant: ARON Lighting LLC, King of Prussia, PA (US)

(72) Inventors: Robert Edwin McLaughlin, III, Boston, MA (US); Robert Norman Aronchick, Villanova, PA (US); Bryan Paul Aronchick, Havertown, PA (US)

(73) Assignee: ARON Lighting LLC, Conshohocken, PA (US)

( * ) Notice: Subject to any disclaimer, the term of this patent is extended or adjusted under 35 U.S.C. 154(b) by 0 days.

(21) Appl. No.: 16/266,356

(22) Filed: Feb. 4, 2019

(65) Prior Publication Data

US 2019/0242560 A1 Aug. 8, 2019

Related U.S. Application Data

(60) Provisional application No. 62/627,311, filed on Feb. 7, 2018.

(51) Int. Cl.
*F21V 21/04* (2006.01)
*F21S 8/02* (2006.01)
*F21Y 115/10* (2016.01)

(52) U.S. Cl.
CPC ............ *F21V 21/048* (2013.01); *F21S 8/026* (2013.01); *F21Y 2115/10* (2016.08)

(58) Field of Classification Search
CPC . F21S 8/026; F21S 8/036; F21S 2/005; F21V 21/14
USPC .......................................... 362/150, 364–366
See application file for complete search history.

(56) References Cited

U.S. PATENT DOCUMENTS

| | | |
|---|---|---|
| 3,078,366 A | 2/1963 | Winkler |
| 3,502,860 A | 3/1970 | Mulvey et al. |
| 5,408,363 A | 4/1995 | Kano |
| 5,709,460 A | 1/1998 | Lester |
| 5,777,857 A | 7/1998 | Degelmann |
| 7,392,629 B1 | 7/2008 | Bankston et al. |
| 8,702,264 B1 | 4/2014 | Rashidi |
| 2002/0141181 A1 | 10/2002 | Bailey |

(Continued)

FOREIGN PATENT DOCUMENTS

EP 2650599 A1 10/2013

OTHER PUBLICATIONS

DIY Network, How to Install a Tin Ceiling, Apr. 13, 2015, web page, pertinent pp. 1-6 (Year: 2015).*

*Primary Examiner* — Andrew J Coughlin
*Assistant Examiner* — Keith G. Delahoussaye
(74) *Attorney, Agent, or Firm* — Duane Morris LLP

(57) ABSTRACT

A lighting assembly includes a base plate and a lighting module coupled to the base plate. The lighting module includes a light source and a housing supporting the light source. The housing includes a first end adjacent the base plate, a second end spaced apart from the first end, and a first face and a second face extending from the first end toward the second end. The lighting assembly is configured to be coupled to a ceiling grid such that the base plate is mounted above an intersection of a first member and second member of the ceiling grid. The first and second member are each t-shaped having a vertical portion and a horizontal portion. The first and second faces of the housing extend downward from the base plate toward the horizontal portions of the first and second members.

20 Claims, 12 Drawing Sheets

(56) References Cited

U.S. PATENT DOCUMENTS

| | | |
|---|---|---|
| 2008/0087464 A1 | 4/2008 | Patterson et al. |
| 2010/0315833 A1 | 12/2010 | Holman et al. |
| 2011/0175533 A1 | 7/2011 | Holman et al. |
| 2013/0039047 A1* | 2/2013 | Kim .......................... F21L 4/02 362/184 |
| 2013/0294061 A1 | 11/2013 | Sorensen et al. |
| 2014/0071665 A1 | 3/2014 | Huang |
| 2015/0138779 A1 | 5/2015 | Livesay et al. |
| 2017/0082253 A1 | 3/2017 | Sorensen et al. |

* cited by examiner

DOWNLIGHT FOR CEILING SYSTEM

CROSS-REFERENCE TO RELATED APPLICATIONS

This application claims priority to U.S. Provisional Application No. 62/627,311, filed on Feb. 7, 2018, the entirety of which is incorporated herein by reference.

FIELD

This invention relates to lighting systems and, specifically, to downlighting systems installed in ceilings.

BACKGROUND

Many architectural commercial spaces feature grid ceiling systems. These systems are made up of a plurality of members arranged in a grid pattern. The members are often t-shaped, having a vertical portion and a horizontal portion. This grid or T-bar system is suspended from a ceiling to create a finished look. Any piping, wiring, etc. can be hidden above this "drop" ceiling. Most "downlight" or "directional" luminaires are installed in the middle of the panels within this grid system. However, an architect may design lighting to install in a variety of positions and layouts.

One downlight system is disclosed in U.S. Patent Application Publication No. 2017/0082253. This application discloses an LED downlight configured for mounting at an intersection of the ceiling grid. Specifically, the application discloses a device formed from two separate "housings." A first housing is mounted above the intersection of the ceiling grid and a second housing is coupled to the first housing from below the intersection of the ceiling grid. The result is a single light emitting surface that sits partially below the surrounding ceiling.

SUMMARY

In one aspect, a lighting assembly includes a base plate and a lighting module coupled to the base plate. The lighting module includes a light source and a housing supporting the light source. The housing includes a first end adjacent the base plate, a second end spaced apart from the first end, and a first face and a second face extending from the first end toward the second end. The lighting assembly is configured to be coupled to a ceiling grid such that the base plate is mounted above an intersection of a first member of the ceiling grid and a second member of the ceiling grid. The first member and the second member are each t-shaped having a vertical portion and a horizontal portion extending along a length of the respective member. The first face and the second face of the housing extend downward from the base plate toward the horizontal portions of the first member and the second member.

In another aspect, a lighting assembly includes a base plate, a first lighting module, and a second lighting module. The first lighting module is coupled to the base plate and includes a light source and a housing supporting the light source. The second lighting module is coupled to the base plate and includes a light source and a housing supporting the light source. The first and second lighting modules are independently coupled to the base plate. The light assembly is configured to be coupled to a ceiling grid such that the base plate is mounted above an intersection of a first member of the ceiling grid and a second member of the ceiling grid with the first lighting module disposed on a first side of the first member and the second lighting module disposed on the opposite side of the first member.

In another aspect, a lighting kit includes a base plate, a lighting module, and a cutting tool. The lighting module is configured to couple to the base plate and includes a light source and a housing supporting the light source. The cutting tool is configured to create a recess in a ceiling tile configured to conform to the housing of the lighting module.

In another aspect, a ceiling assembly includes a ceiling grid, a lighting assembly, and at least one ceiling tile. The ceiling grid includes a first member having a vertical portion and a horizontal portion extending along a length of the first member. The ceiling grid also includes a second member having a vertical portion and a horizontal portion extending along a length of the second member. The first member and the second member intersect at an intersection. The lighting assembly includes a base plate and a first lighting module coupled to the base plate. The lighting module includes a light source and a housing supporting the light source. The housing includes a first end adjacent the base plate, a second end spaced apart from the first end, a first face and a second face extending from the first end toward the second end, and a flange at the second end. The lighting assembly is coupled to the ceiling grid such that the base plate is mounted above the intersection of the first member of the ceiling grid and the second member of the ceiling grid. The first face and the second face of the housing extend downward from the base plate toward the horizontal portions of the first member and the second member. The at least one ceiling tile is supported by the horizontal portions of the first member and the second member and by the flange of the housing of the lighting module.

BRIEF DESCRIPTION OF DRAWINGS

These and other features of the devices and methods provided herein will be more fully disclosed in, or rendered obvious by, the following detailed description of the preferred embodiments of the invention, which is to be considered together with the accompanying drawings wherein like numbers refer to like parts and further wherein.

DETAILED DESCRIPTION

Figure 1:
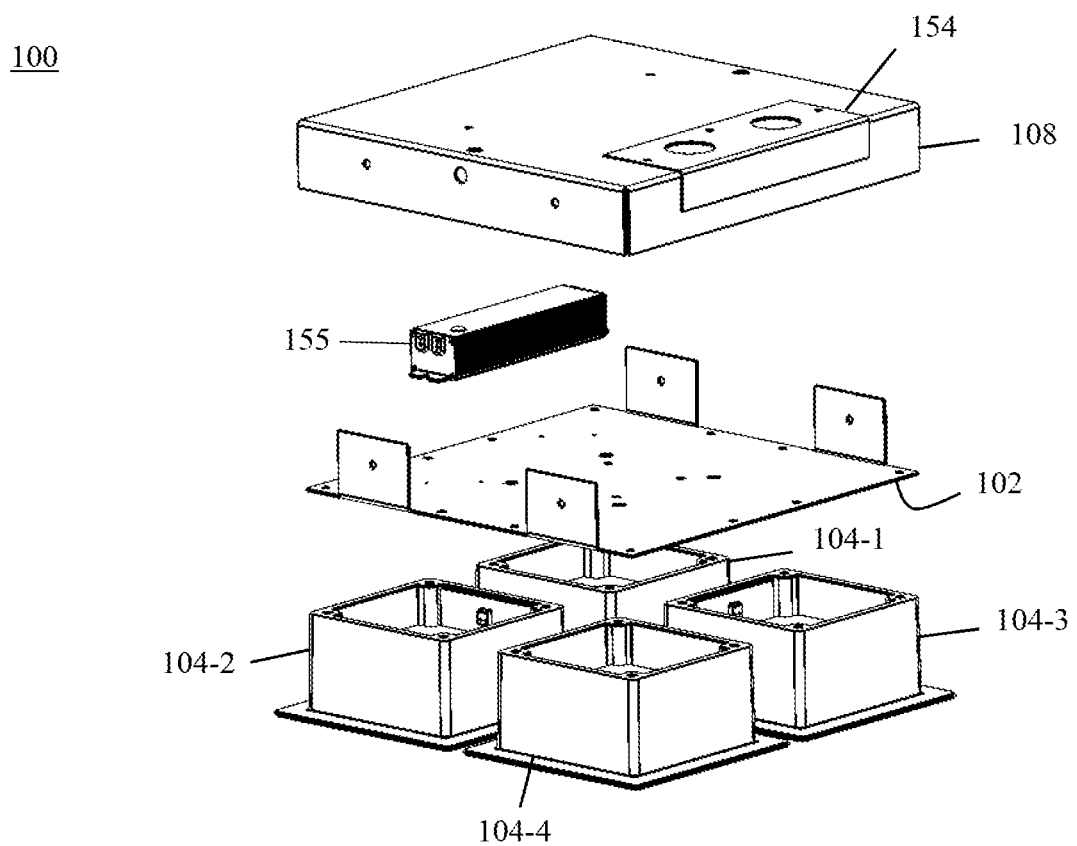
FIG. 1 shows an exploded perspective view of a lighting assembly, according to one embodiment described herein.
Figure 2:
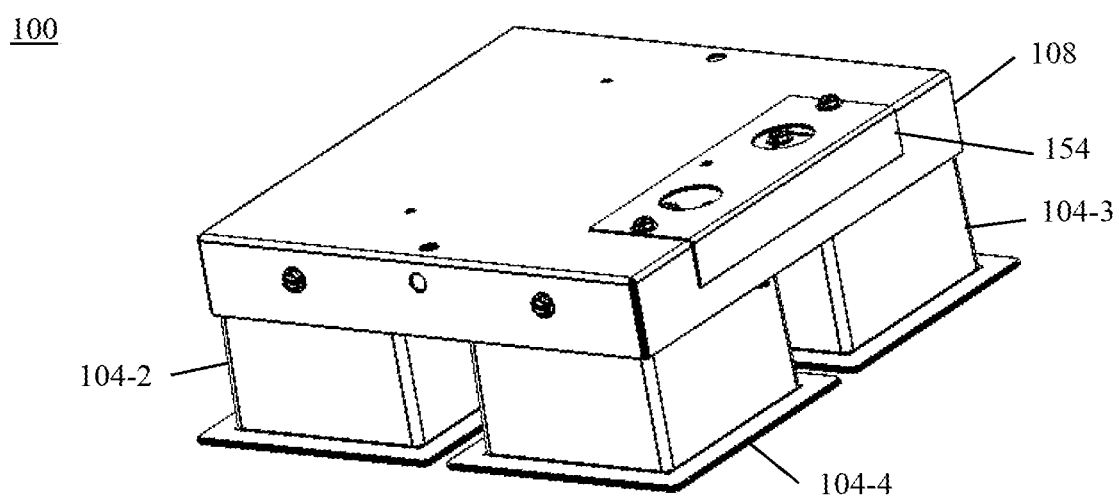
FIG. 2 shows a perspective view of the lighting assembly of FIG. 1.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "coupled," "connected" and "interconnected," refer to a relationship wherein structures are secured or attached to one another either directly or indirectly through intervening structures, as well as both movable or rigid attachments or relationships, unless expressly described otherwise. The term "operatively or operably connected" or "operatively coupled" or "operably coupled" is such an attachment, coupling or connection that allows the pertinent structures to operate as intended by virtue of that relationship. In the claims, means-plus-function clauses, if used, are intended to cover the structures described, suggested, or rendered obvious by the written description or drawings for performing the recited function, including not only structural equivalents but also equivalent structures.

As used herein, use of a singular article such as "a," "an" and "the" is not intended to exclude pluralities of the article's object unless the context clearly and unambiguously dictates otherwise.

Described in this disclosure is a downlight, for example an LED downlight, that is configured to be installed or integrated into a suspended grid ceiling. In embodiments, the downlight has a base plate that mounts above the intersection of a T-bar grid ceiling. The downlight includes one or more lighting modules that extend down from the base plate. Each of the lighting modules is positioned in one quadrant of the intersection defined by the cross-members of the ceiling grid. The lighting assemblies described herein provide a modular system that is easy to install and can be configured to meet the needs of a specific installation. Furthermore, the lighting assemblies described herein provide an appearance that the lighting modules are integrated into the ceiling grid.

In one embodiment, as shown in FIG. 1, a lighting assembly 100 includes a base plate 102 and at least one lighting module 104 (e.g., four lighting modules 104-1, 104-2, 104-3 and 104-4). When assembled, each lighting module 104 is independently coupled to a lighting module attachment element 106 of the base plate 102, as will be described further herein with reference to FIG. 5. The lighting assembly 100 may further include a cover 108.

Figure 3:
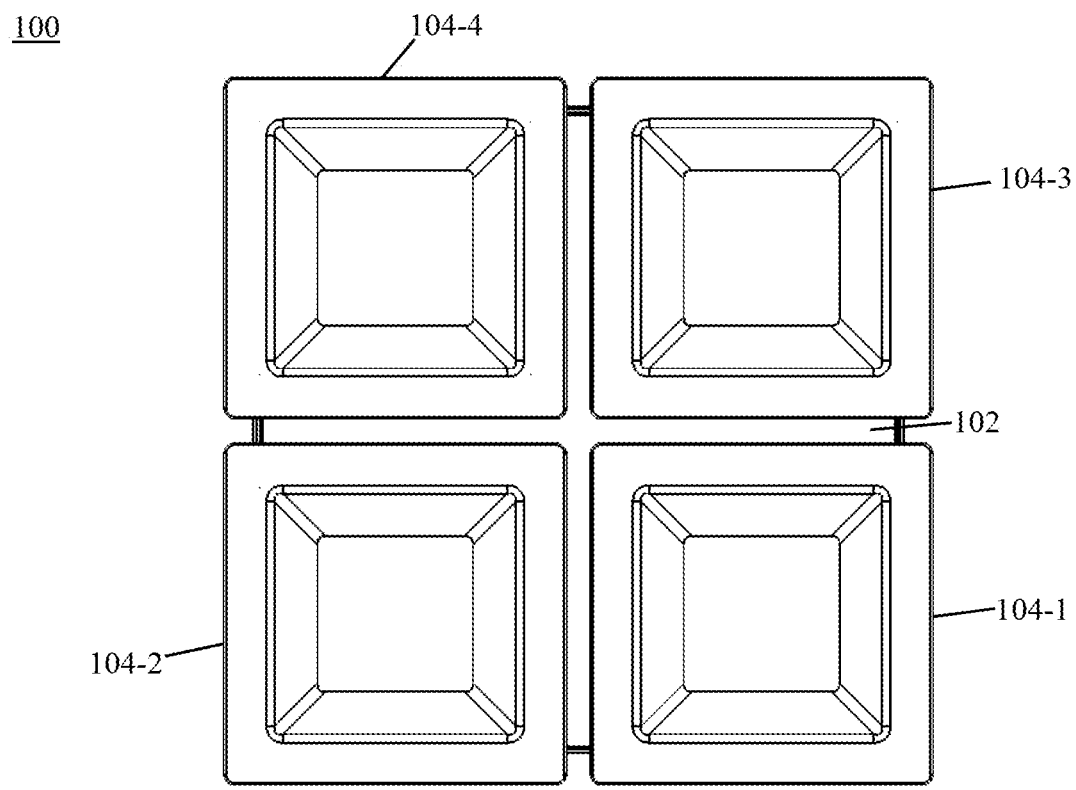
FIG. 3 shows a bottom view of the lighting assembly of FIG. 1, with four lighting modules.
Figure 4:
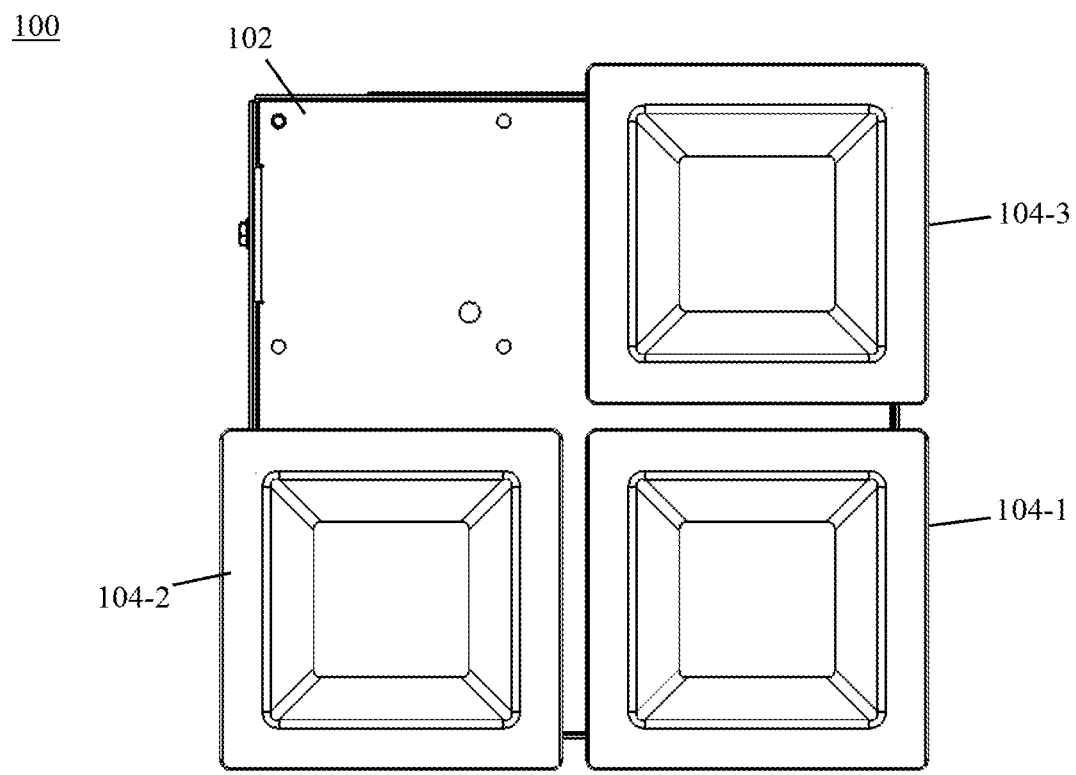
FIG. 4 shows a bottom view of the lighting assembly of FIG. 1, with three lighting modules.

The lighting assembly 100 may include any number of lighting modules 104. As shown in FIG. 3, in one embodiment, the lighting assembly 100 includes four lighting modules 104 arranged in a 2×2 grid. This allows the lighting modules 104 to be positioned such that they are on opposite sides of members of a ceiling grid, as will be described further herein. A lighting module 104 may be attached to all or fewer than all of the attachment elements 106. For example, as shown in FIG. 4, the lighting assembly 100 may include only three lighting modules 104. The lighting assembly 100 may also include one lighting module 104 or two lighting modules 104. The lighting modules 104 can be positioned in any arrangement. This allows for the customization of the lighting assembly 100 to meet the needs of the specific installation.

Figure 5:
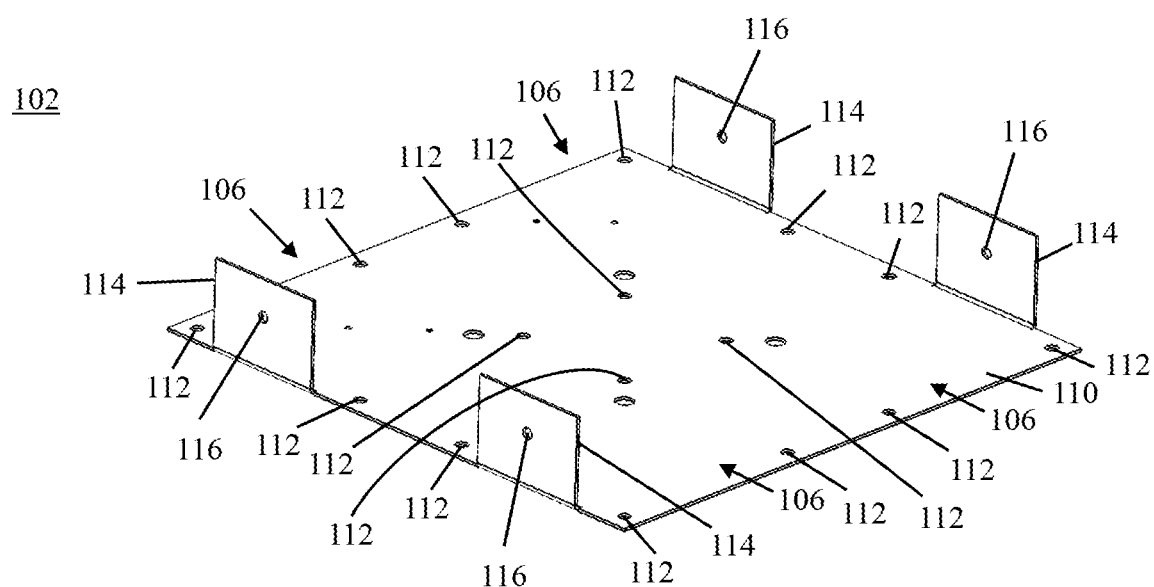
FIG. 5 shows a perspective view of a base plate, according to one embodiment described herein.

The base plate 102 is shown in more detail in FIG. 5. In this embodiment, the base plate 102 includes a primary portion 110 that is in the form of a generally flat plate. The primary portion 110 includes the attachment elements 106. The attachment elements 106 may be any design appropriate for coupling the lighting modules 104 to the base plate 102. In this embodiment, each attachment element 106 includes four through holes 112 that are configured to receive screws (bolts or the like) therein to couple the base plate 102 to a mating screw recess in a lighting module 104, as will be described in more detail herein. It should be understood that each attachment element 106 may include any number of through holes 112. In other embodiments (not shown), the attachment elements 106 include clips for engaging openings in the lighting module 104. In other embodiments (not shown), the attachment elements 106 include openings for receiving clips on the lighting module 104.

The base plate 102 may also include one or more upward extending tabs 114. The upward extending tabs 114 are configured for coupling the base plate 102 to the cover 108, as will be described in more detail herein. The upward extending tabs 114 may include holes 116 for coupling the base plate 102 to the cover 108. The base plate 102 may be constructed of any appropriate material. In one embodiment, the base plate 102 is constructed of sheet metal, such as aluminum or steel.

Figure 6:
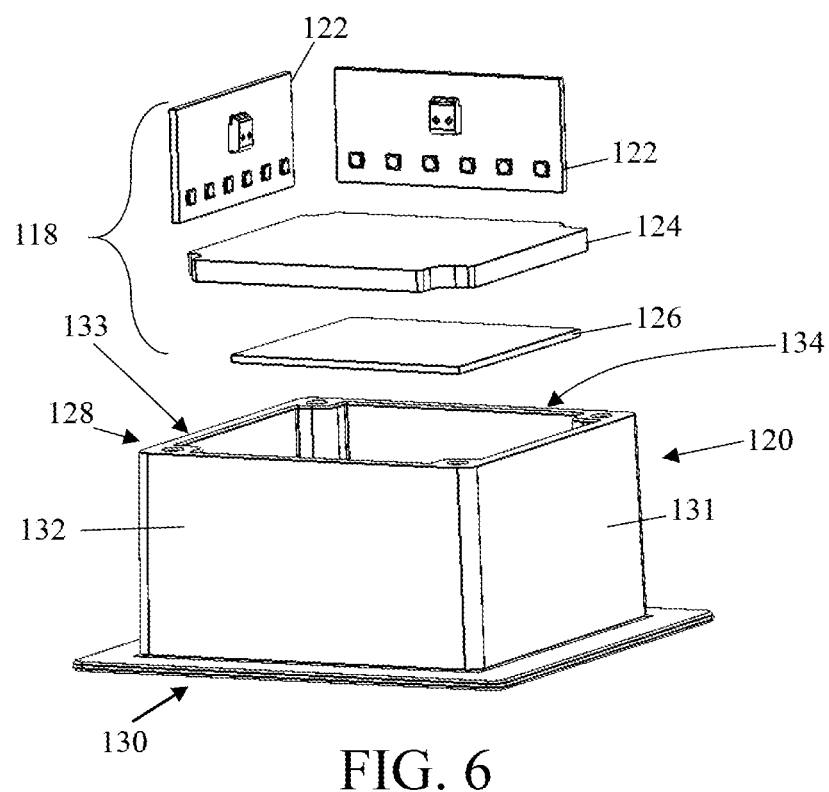
FIG. 6 shows an exploded perspective view of a lighting module, according to one embodiment described herein.

As shown best in the exploded view of FIG. 6, each lighting module 104 includes a light source 118 and a housing 120 supporting the light source 118. The light source 118 may be any appropriate light source. For example, the light source may include one or more incandescent bulbs, fluorescent bulbs, compact fluorescent (CFL) bulbs, or light emitting diodes (LEDs). For example, in one embodiment (not shown) one or more LEDs may face straight down to shine directly through an optical aperture (a direct-lit system). Alternatively, or additionally, an edge-lit optical system can be used, as described below. In another embodiment (not shown), the lighting modules 104 do not include their own light source. Instead, a single light source is used to illuminate each of the lighting modules 104.

In various embodiments, as shown in FIG. 6, each lighting module 104 includes its own, independent edge-lit lighting system. The lighting system includes an LED board 122. The LED board 122 includes a plurality of LEDs that are configured to shine through a light guide 124. In one embodiment, the light guide 124 is constructed of acrylic. In one embodiment, the light guide 124 is about 4.5 mm thick. A reflector (e.g., reflector 127 shown in FIG. 8B) may be positioned behind the light guide 124. The light source 118 may further include a diffuser 126. The diffuser 126 can be flat, formed, or have an angled shape.

Figure 7:
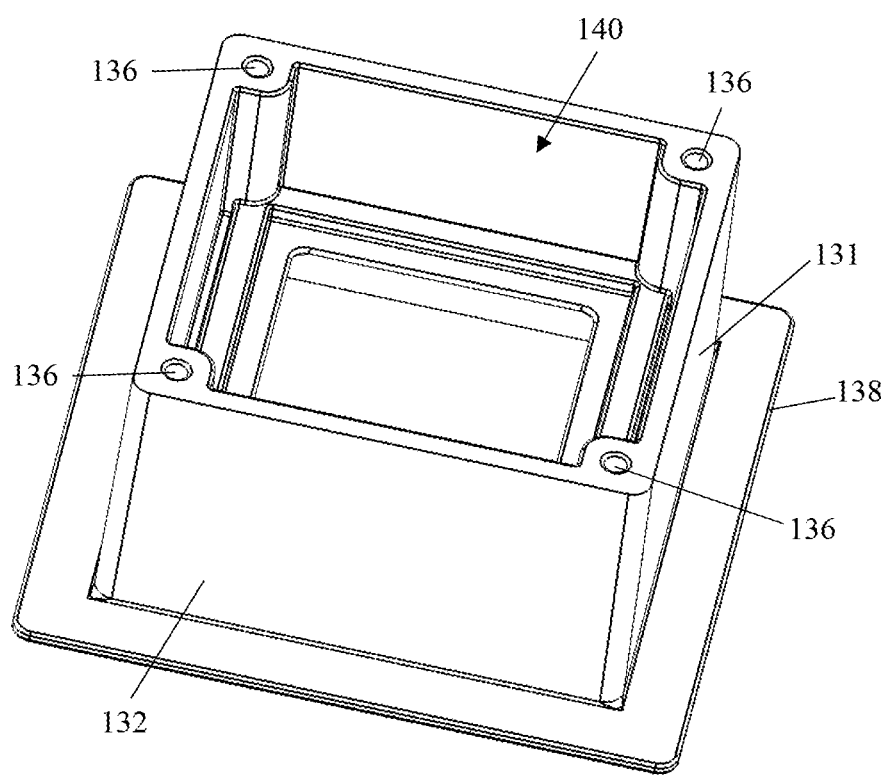
FIG. 7 shows a perspective view of a lighting module housing, according to one embodiment described herein.

As shown in FIGS. 6 and 7, the housing 120 has a first end 128 that, when assembled, is adjacent to the base plate 102, as shown in FIG. 1. The housing 120 also has a second end 130 spaced apart from the first end 128. A first face 131, a second face 132, a third face 133, and a fourth face 134 extend from the first end 128 toward the second end 130. In one embodiment, when assembled to the base plate 102, the faces 131-134 are substantially perpendicular to the primary portion 110 of the base plate 102. In other embodiments, the faces 131-134 may extend at an angle with respect to the base plate 102. The housing 120 may be configured such that the distance between the first end 128 and the second end 130 is approximately the same as the height of a T-bar ceiling grid member. For example, in one embodiment, the distance between the first end 128 and the second end 130 is between about 40 mm and 50 mm. In one embodiment, the distance between the first end 128 and the second end 130 is about 45 mm. The housing 120 can have various geometries—for example the square shape shown in FIG. 7 or the quarter-round shape shown in FIG. 14—without affecting the function of the device.

In various embodiments, at the first end 128 the housing 120 includes one or more bores 136 configured to receive a screw inserted through the through holes 112 in the base plate 102 to couple the lighting module 104 to the base plate 102. The bores 136 may include internal threads to engage the threads of the screw.

In at least one embodiment, the housing 120 includes a flange 138 extending outward at the second end 130. The flange 138 is configured to at least partially support a ceiling tile when the lighting assembly 100 is mounted in a ceiling grid, as will be described further herein. In one embodiment, as shown, the flange 138 extends around the entire perimeter of the housing 120. In other embodiments, the flange 138 extends around less than the entire perimeter of the housing 120, as shown in FIG. 8B. For example, the flange 138 may extend along only two of the sides (e.g., first side 131 and second side 132). The flange 138 can have any appropriate dimensions. For example, in one embodiment, the flange 138 extends between about 5 mm and 15 mm from the respective side (e.g., first side 131). In one embodiment, the flange 138 extends about 10 mm from the respective side (e.g., first side 131). In one embodiment, the thickness of the flange 138 is between about 1 mm and about 3 mm. In one embodiment, the thickness of the flange is about 2 mm.

Figure 8A:
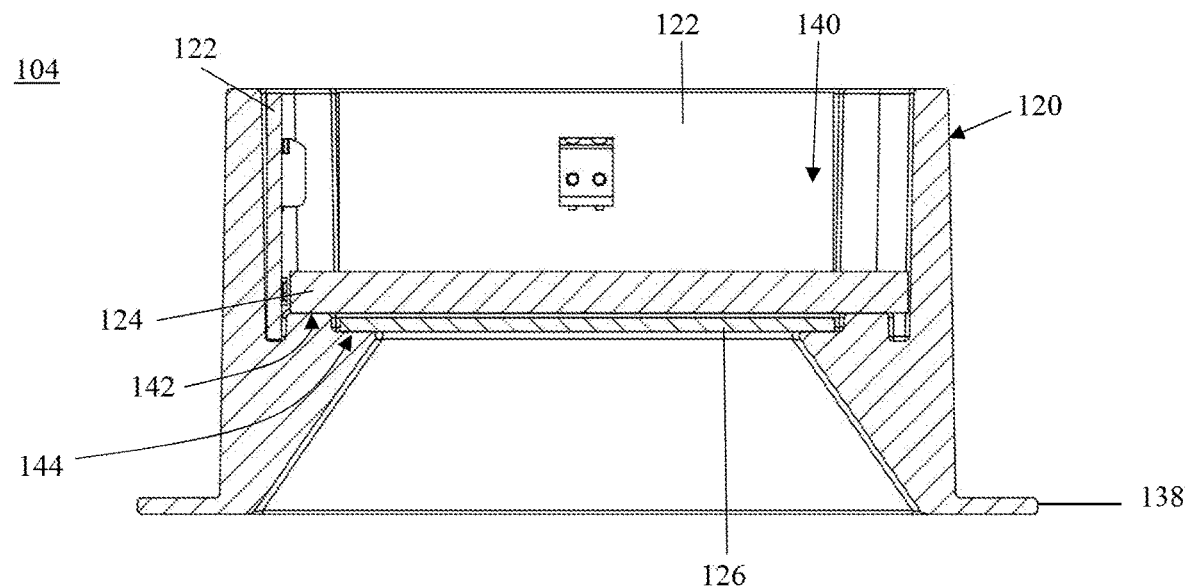
FIG. 8A shows a cross-sectional perspective view of the lighting module of FIG. 6.
Figure 8B:
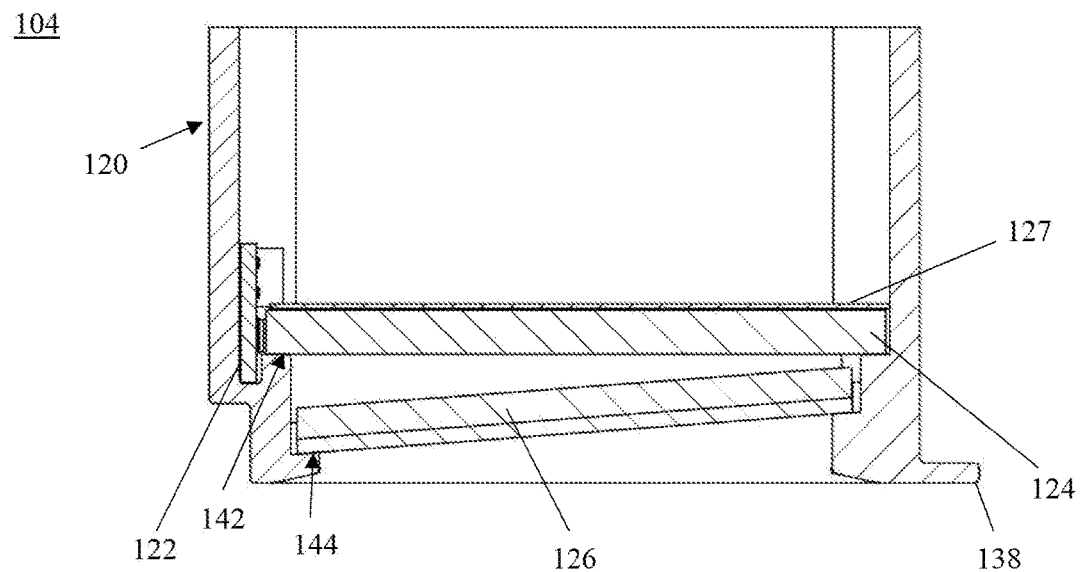
FIG. 8B shows a cross-sectional side view of a lighting module according to another embodiment described herein.

As shown in FIG. 8A, the housing 120 includes an internal chamber 140 for housing the light source 118. In one embodiment, the housing 120 includes a first lip 142 for supporting the light guide 124. The housing 120 further includes a second lip 144 for supporting the diffuser 126. When assembled, the diffuser 126 rests on the second lip 144 and the light guide 124 rests on the first lip 142. The portion of the internal chamber 140 that is below the second lip 144 (and the diffuser 126) may have any appropriate design to achieve the desired light projection. For example, as shown in FIG. 8A, this portion can extend at a widening angle.

In various embodiments, shown in FIG. 8B, the second lip 144 is at an angle such that the diffuser 126 sits at an angle within the housing 120 (i.e., the diffuser 126 is not parallel to the flange 138). It should be understood that first lip 142 and second lip 144 need not be continuous and may only extend along a portion of the internal chamber 140.

Figure 9:
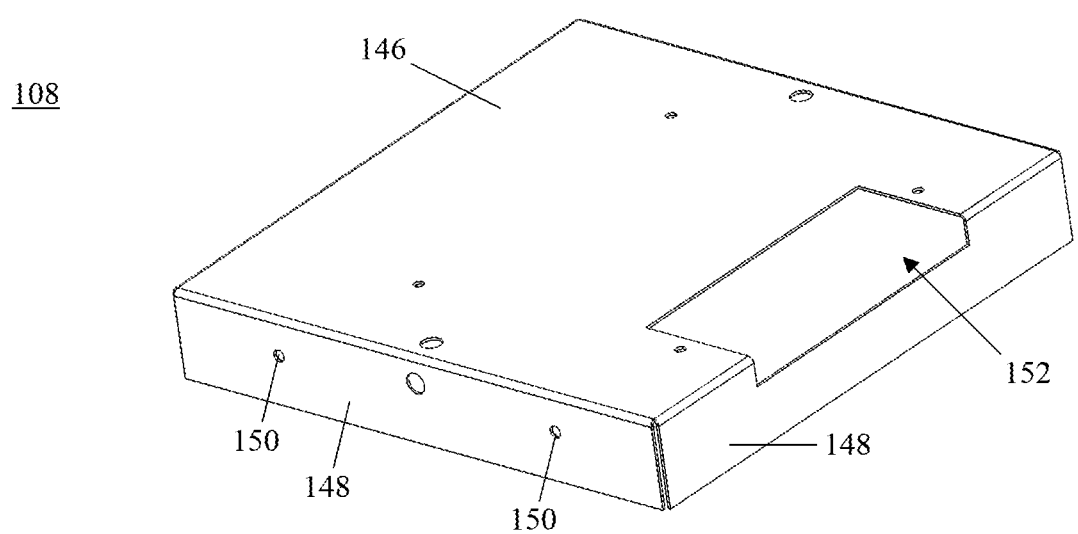
FIG. 9 shows a perspective view of a cover, according to one embodiment described herein.

FIG. 9 shows the cover 108. The cover 108 includes a generally flat top portion 146 and downward extending sides 148. One or more of the sides 148 may include holes 150 for coupling to the tabs 114 of the base plate 102 (e.g., using screws, bolts, or pins). The cover 108 may also include a window 152 to allow access to the electrical components housed between the cover 108 and base plate 102 (e.g., LED driver 155). When assembled, the window 152 may be covered by an access plate 154 (shown in FIG. 1).

As shown in FIG. 1, electrical components may be positioned in the space defined between the base plate 102 and the cover 108. For example, the electrical components may include an LED driver 155. The LED driver 155 is electrically coupled to the light source 118 within each lighting module 104. The LED driver 155 is also electrically coupled to a main power source (not shown). The access plate 154 is removably coupled to the cover 108 to allow access to the electrical components for servicing. The cover 108 may also be removably coupled to the base plate 102 to further provide access to the electrical components. Alternatively, in other embodiments (not shown), the electrical components are housed within a separate box positioned adjacent to the base plate 102.

Figure 10:
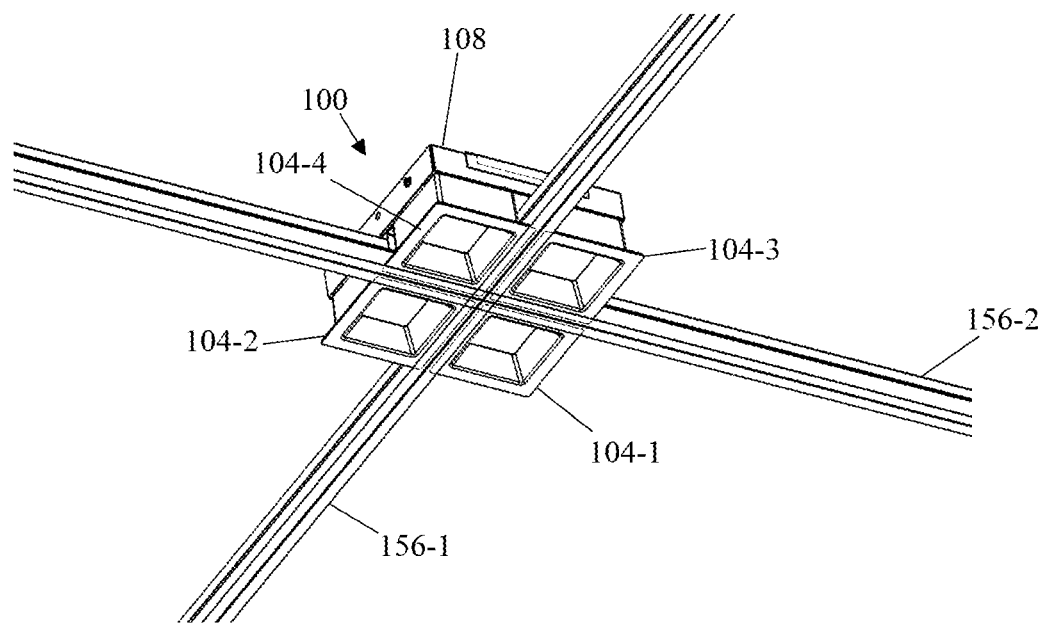
FIG. 10 shows a bottom perspective view of the lighting assembly of FIG. 1 installed in a ceiling grid.
Figure 11:
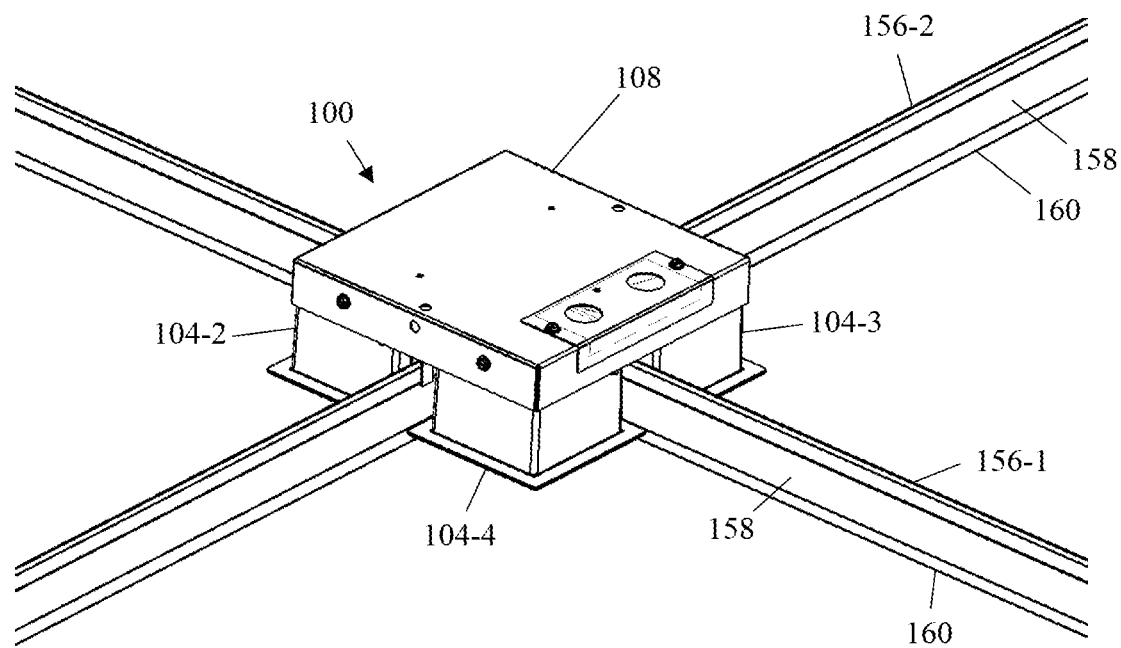
FIG. 11 shows a top perspective view of the lighting assembly of FIG. 1 installed in a ceiling grid.

As shown in FIGS. 10 and 11, the lighting assembly 100 is configured to be coupled to a ceiling grid such that the base plate 102 is mounted above an intersection of a first member 156-1 of the ceiling grid and a second member 156-2 of the ceiling grid. Both the first member 156-1 and the second member 156-2 are t-shaped with a vertical portion 158 and a horizontal portion 160 extending along a length of the respective member. It should be understood that the first member 156-1 and/or the second member 156-2 may be made up of multiple pieces joined together. For example, the second member 156-2 may include a first piece extending from the intersection with the first member 156-1 in a first direction and a second piece extending from the intersection in a second direction.

When coupled to the ceiling grid, the first face 131 and second face 132 of the housing 120 extend downward from the base plate 102 toward the horizontal portions 160 of the first member 156-1 and the second member 156-2. In one embodiment, the first face 131 of the housing 120 is configured to be parallel to the vertical portion 158 of the first member 156-1 and the second face 132 of the housing 120 is configured to be parallel to the vertical portion 158 of the second member 156-2.

As shown in FIG. 10, each of the lighting modules 104 attached to the base plate 102 is positioned in a respective quadrant of the ceiling grid, where the quadrants are defined by the intersection of the first member 156-1 and the second member 156-2. For example, the first lighting module 104-1 is on a first side of the vertical portion 158 of the first member 156-1 and the second lighting module 104-2 is on an opposite side of the vertical portion 158 of the first member 156-1. Further, the first lighting module 104-1 is on a first side of the vertical portion 158 of the second member 156-2 and the third lighting module 104-3 is on an opposite side of the vertical portion 158 of the second member 156-2. Finally, the fourth lighting module 104-3 is on the opposite side of the vertical portion 158 of both the first member 156-1 and the second member 156-2 from the first lighting module 104-1.

Figure 12:
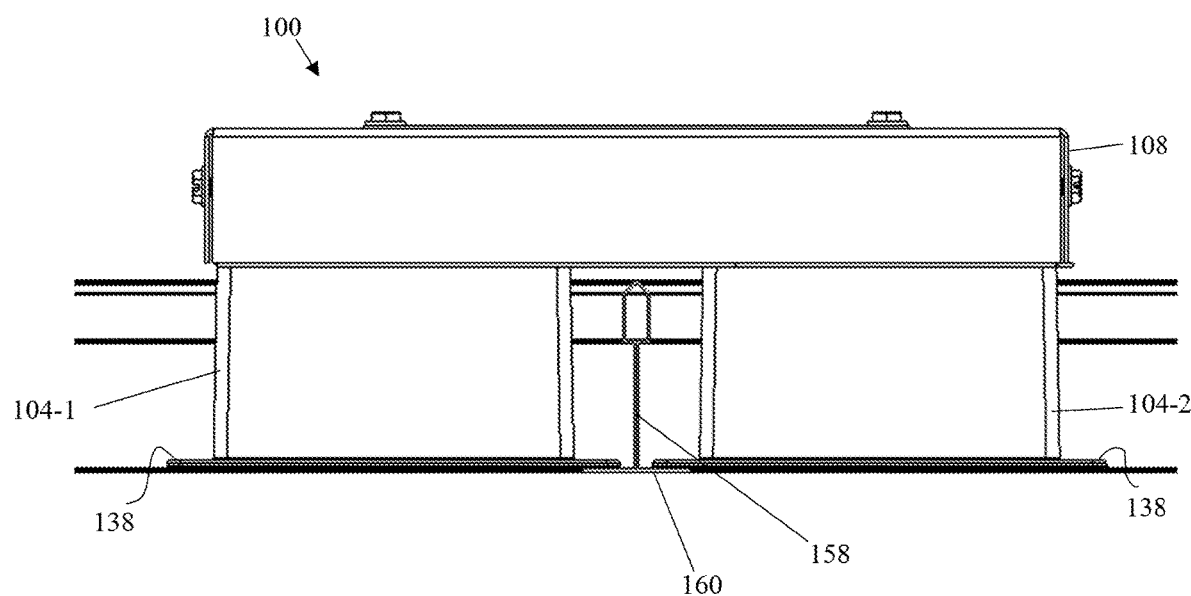
FIG. 12 shows a side view of the lighting assembly of FIG. 1 installed in a ceiling grid.

When installed, the flange 138 of the housing 120 of each lighting module 104 may contact the horizontal portion 160 of one or both of the members 156, as shown in FIG. 12. In other embodiments in which the flange 138 extends around less than the entire perimeter of the housing 120 (as shown in FIG. 8B), the second end 130 of the housing 120 may be flush with the bottom of the members 156.

Figure 13:
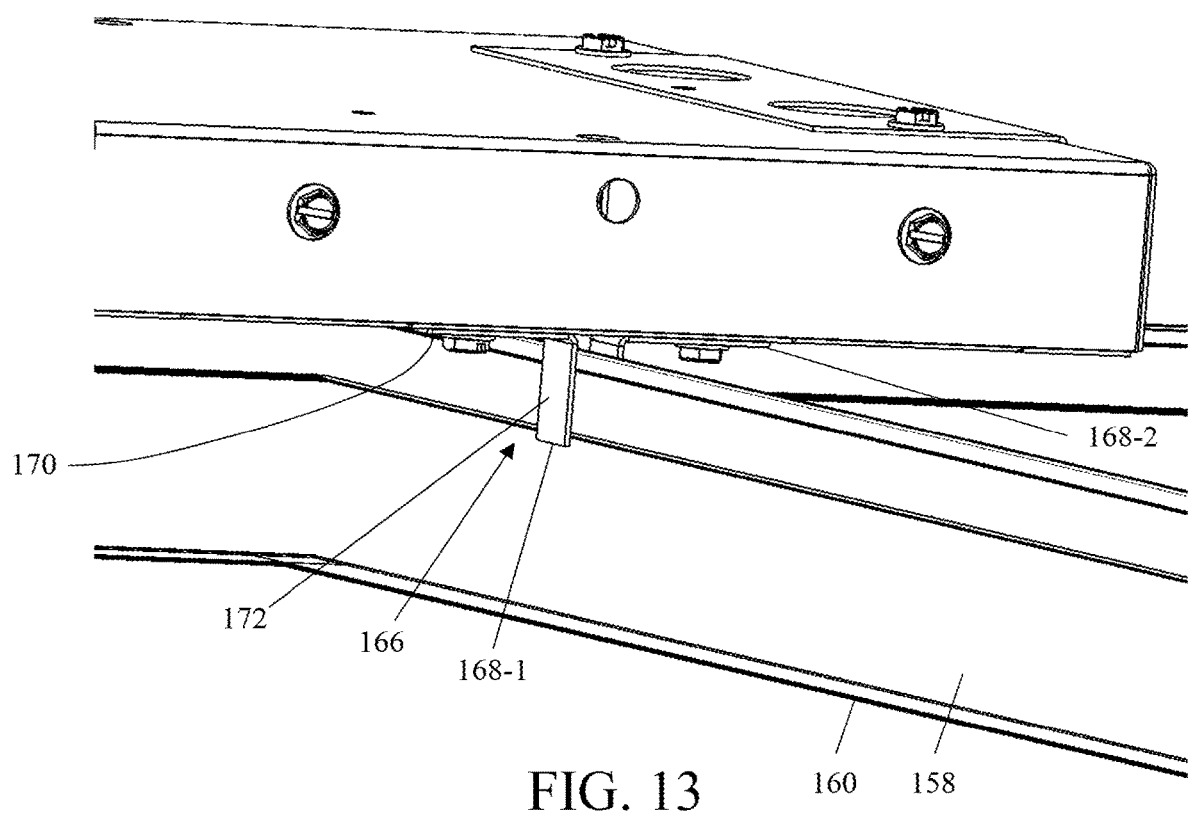
FIG. 13 shows a perspective view of the lighting assembly of FIG. 1 installed in a ceiling grid showing a mounting bracket coupling the lighting assembly to a member of the ceiling grid.

As shown in FIG. 13, the lighting assembly 100 may further include one or more mounting brackets 166 coupled to the base plate 102. Each of the mounting brackets 166 are configured to couple the lighting assembly 100 to the vertical portion 158 of either the first member 156-1 or the second member 156-2 of the ceiling grid. As shown in FIG. 11, in one embodiment, the mounting bracket 166 includes a first mounting arm 168-1 and a second mounting arm 168-2. Each of the mounting arms 168 include a first portion 170 coupled to the base plate 102 and a second portion 172 extending downward, away from the base plate 102. When installed in a ceiling grid, the second portions 172 of the respective mounting arms 168 are positioned on opposite sides of the vertical portion 158 of the first member 156-1 of the ceiling grid. Hence, the mounting arms 168 prevent movement of the lighting assembly 100 transverse to the vertical portion 158 of the first member 156-1. Similarly, a second mounting bracket (not shown) may be provided that includes mounting arms that straddle the vertical portion 158 of the second member 156-2 to prevent motion of the lighting assembly 100 transverse to the vertical portion 158 of the second member 156-2. Hence, in this way, the position of the lighting assembly 100 may be fully defined.

Figure 18:
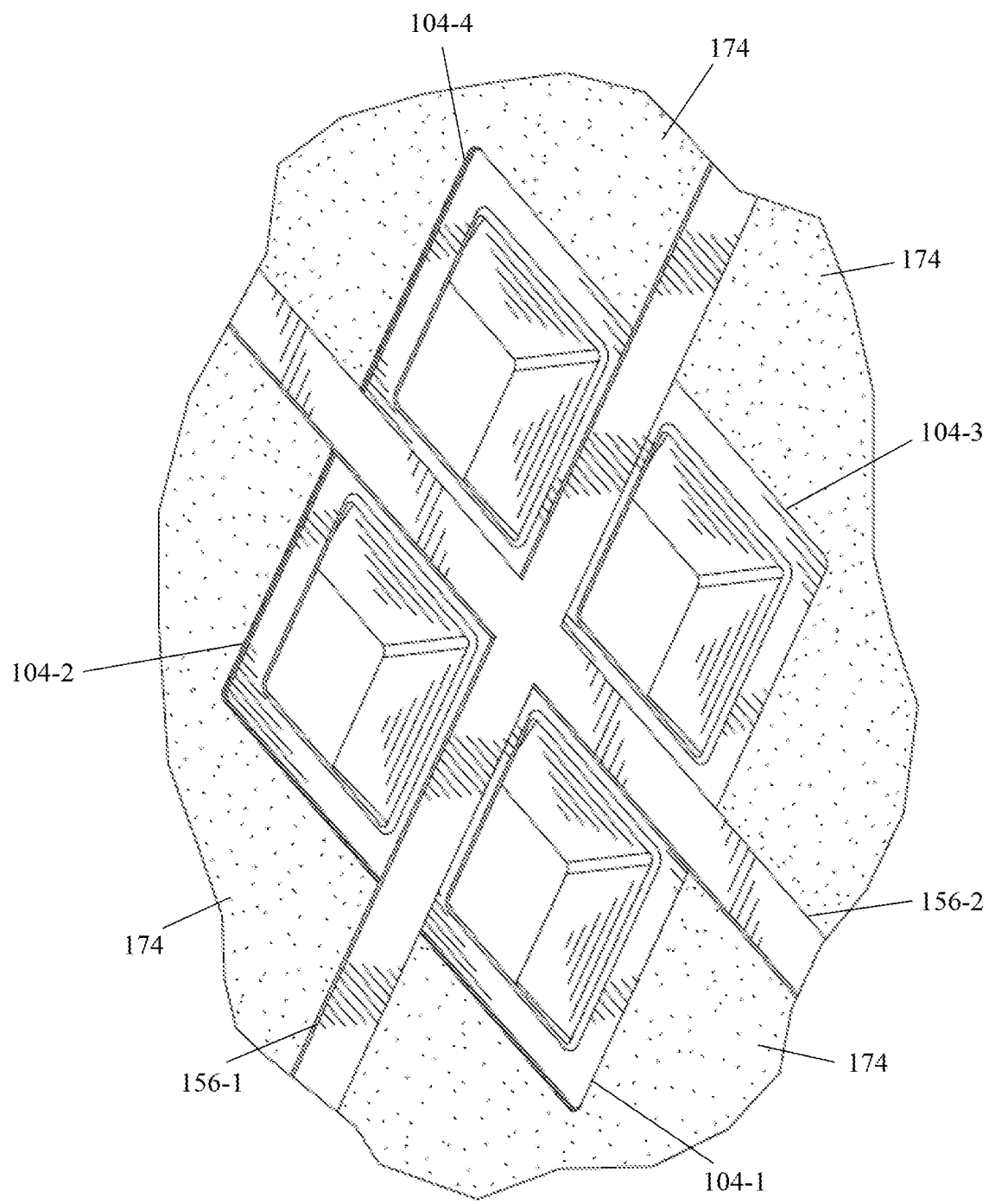
FIG. 18 shows a perspective view of a ceiling assembly including the lighting assembly of FIG. 3.

Turning to FIG. 18, after mounting the lighting assembly 100 to the ceiling grid, ceiling tiles 174 can be mounted in the ceiling grid to form a ceiling assembly. When installed, the ceiling tiles 174 are supported by the horizontal portions 160 of the first member 156-1 and second member 156-2 of the ceiling grid as well as the flange 138 of the housing 120 of the lighting module 104. Hence, as shown in FIG. 18, the lighting modules 104 appear to be integrated into the ceiling grid. Before installation, the ceiling tiles 174 may be cut to accommodate the lighting modules 104, as will be described further herein.

Figure 14:
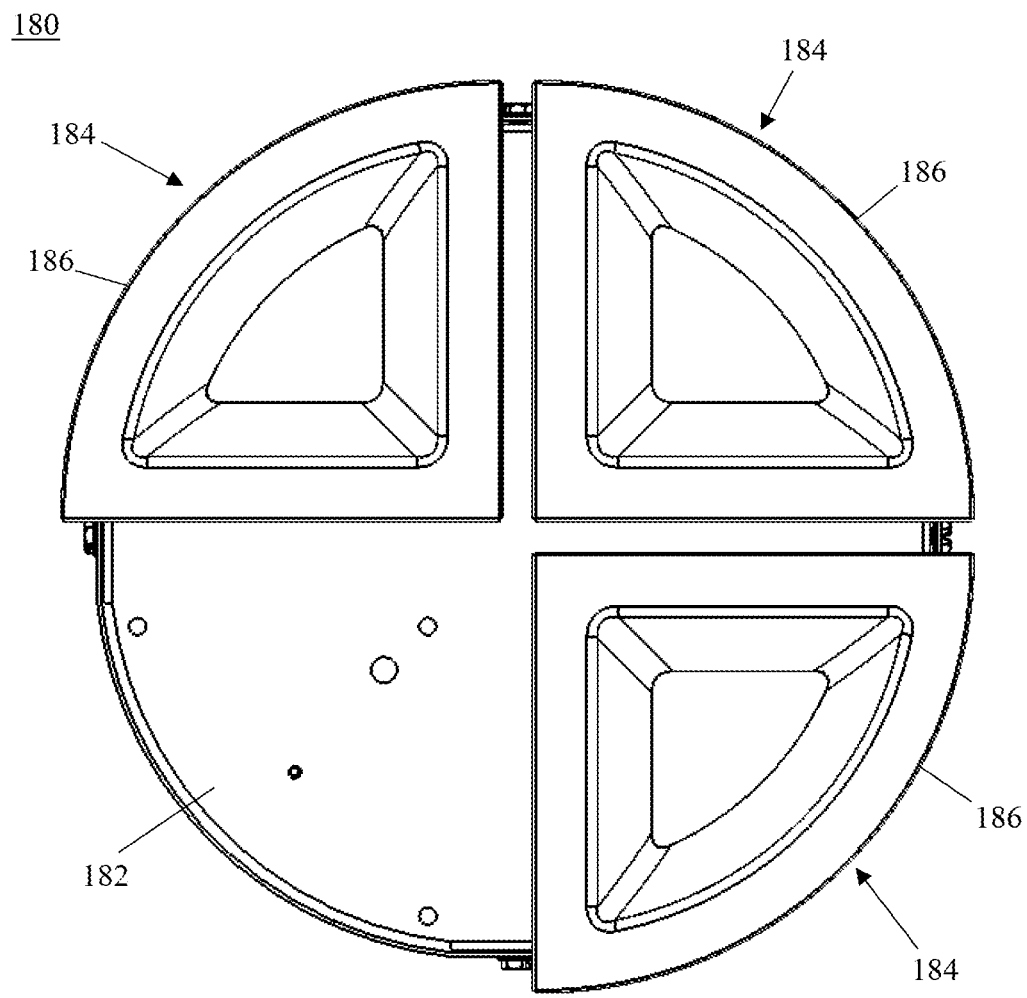
FIG. 14 shows a bottom view of a lighting assembly, according to another embodiment.

The lighting assembly may be provided in any configuration to achieve a desired aesthetic appearance without changing the function of the lighting assembly. For example, as shown in FIG. 14, in one embodiment, a lighting assembly 180 has a generally round configuration. Such an embodiment may include a generally round base plate 182 and one or more lighting modules 184 having a housing 186 with a quarter round configuration. In other, functional aspects, the lighting assembly 180 may be substantially similar to lighting assembly 100 described above.

Figure 15:
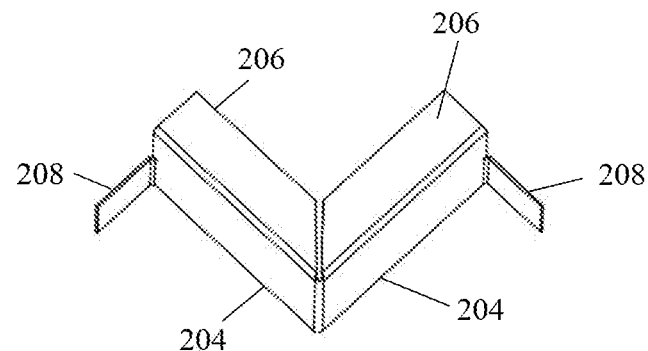
FIG. 15 shows a perspective view of a cutting tool, according to one embodiment described herein.

In another embodiment, a lighting kit includes a lighting assembly 100 as previously described and a cutting tool 202 shown in FIG. 15. The cutting tool 202 is configured to create a recess in a ceiling tile that conforms to the housing 120 of the lighting module 104. The cutting tool 202 can be configured to correspond to various housing 120 geometries without changing how the cutting tool 202 operates. For example, the cutting tool 202 can be configured to create a square cut to correspond to the square lighting modules shown, for example, in FIGS. 1-4 or the cutting tool 202 can create a semi-circular cut to correspond to the quarter-round style lighting modules shown in FIG. 14. The cutting tool 202 allows for easier installation by creating a clean cut in the ceiling tile to avoid breaking or wasting ceiling tiles.

Figure 16:
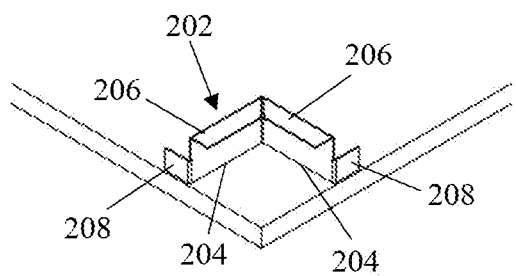
FIG. 16 shows a perspective view of the cutting tool of FIG. 15 positioned to cut a ceiling tile.
Figure 17:
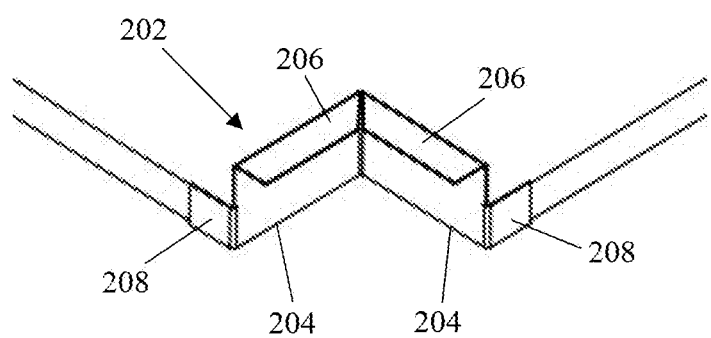
FIG. 17 shows a perspective view of the cutting tool after cutting the ceiling tile.

As shown in FIG. 15, the cutting tool includes cutting edges 204, top flanges 206, and alignment flanges 208. In use, the cutting tool 202 is positioned such that the cutting edges 204 rest against a top face of the ceiling tile and the alignment flanges 208 are parallel to the respective edges of the tile and just outside of the side faces of the tile, as shown in FIG. 16. The user then applies pressure to the top flanges 206 to press the cutting tool 202 downward to cut the tile. As the cutting tool 202 moves downward, the alignment flanges 208 slide along the side faces of the tile. When the cutting tool 202 has cut completely through the tile, the corner of the tile can be removed, as shown in FIG. 17.

The cutting tool 202 can be formed from any appropriate material that is sufficiently rigid such that it can form a cutting edge. For example, the cutting tool 202 can be formed from metal, plastic, or composite material.

In another embodiment, a method of assembling the lighting assembly 100 is provided. The method includes the step of attaching a first lighting module 104-1 to the base plate 102. In certain embodiments, the method further includes attaching a second lighting module 104-2 to the base plate 102. When mounted to the base plate 102, the respective housings 120 of the first lighting module 104-1 and the second lighting module 104-2 are spaced from one another at least the width of the vertical portion of a T-bar ceiling grid member.

In certain embodiments, the method further includes coupling a third lighting module 104-3 to the base plate 102. When coupled to the base plate 102, the housing 120 of the third lighting module 104-1 is spaced apart from the housing 120 of the first lighting module 104-1 a distance that is at least as large as the width of the vertical portion of a T-bar ceiling grid member (as shown, for example, in FIG. 3).

In certain embodiments, the method further includes coupling a fourth lighting module 104-4 to the base plate 102. When coupled to the base plate 102, the housing 120 of the fourth lighting module 104-4 is spaced apart from the housing 120 of the first lighting module 104-1 a distance that is at least as large as the width of the vertical portion of a T-bar ceiling grid member. In addition, the face of the housing 120 of the fourth lighting module 104-4 that faces the third lighting module 104-3 is spaced apart from the third lighting module 104-3 a distance that is at least as large as the width of the vertical portion of a T-bar ceiling grid member. This is shown, for example, in FIG. 3.

The steps of coupling the lighting modules 104 to the base plate 102 may include attaching the lighting modules 104 to the attachment elements 106 of the base plate 102. In at least one embodiment, this includes installing threaded fasteners through holes 112 of the base plate 102 and engaging the fasteners with threaded bores 136 of the housing 120 of the lighting module 104.

The method may further include installing one or more electrical components. For example, in one embodiment, the method includes coupling an LED driver 155 to the base plate 102 on a side of the base plate opposite the lighting modules 104.

The method may further include coupling the cover 108 to the base plate 102 such that the electrical components are disposed between the base plate 102 and the cover 108. The step of coupling the cover 108 to the base plate 102 may include using one or more screws to couple the base plate 102 and the cover 108.

In another embodiment, a method of installing the lighting assembly 100 is provided. The method includes mounting the lighting assembly 100 to a ceiling grid. The lighting assembly 100 may be mounted such that the base plate 102 is positioned above an intersection of a first member 156-1 and a second member 156-2 of the ceiling grid. As described above, the lighting assembly may include any number of lighting modules 104. In one embodiment, the lighting assembly 100 includes one lighting module 104. When the lighting assembly 100 is installed, the housing 120 of each lighting module 104 extends downward from the base plate 102 toward the horizontal portion 160 of the first 156-1 and second 156-2 members of the ceiling grid. In various embodiments, the flange 138 of the housing 120 contacts the horizontal portion 160 of the first member 156-1 and/or the second member 156-2.

In various embodiments, the lighting assembly 100 includes at least two lighting modules 104 and the lighting assembly 100 is mounted such that the first lighting module 104-1 is on a first side of the first member 156-1 of the ceiling grid and the second lighting module 104-2 is on a second side of the first member 156-1 of the ceiling grid. As described above, the lighting assembly 100 may include any number of lighting modules, for example four lighting modules as shown in FIG. 3 and described above. Each of the lighting modules 104 may be positioned in a respective quadrant of the ceiling grid defined by the intersection of the first member 156-1 and the second member 156-2 of the ceiling grid. Mounting the lighting assembly 100 to the grid may include coupling a mounting bracket 166 to one or more members 156 of the grid.

The method of installation may further include using the cutting tool 202 to cut one or more ceiling tiles 174 to remove a section of the ceiling tile 174. The cutting tool 202 is configured to remove a section of the ceiling tile 174 that corresponds to the shape of the lighting module housing 120.

The method of installation may further include installing the cut ceiling tile 174 such that the ceiling tile 174 is supported by horizontal portions 160 of the members 156 of the ceiling grid. In one embodiment, the ceiling tile 174 is also supported by the flange 138 on the housing 120 of the lighting module 104. Hence, when installed the lighting assembly appears to be integrated into the ceiling grid.

The method of installation may further include electrically coupling one or more electrical components (e.g., LED driver 155) of the lighting assembly 100 to a main power source.

In various embodiments, the method of installation may include coupling the lighting modules 104 to the base plate. The lighting module 104 may be coupled to the base plate 102 in any appropriate manner. For example, the lighting modules 104 may be coupled to the base plate 102 using screws, bolts, or other threaded fasteners, as described above. In other embodiments (not shown), the base plate and lighting modules are coupled with clips.

In other embodiments, the lighting assembly 100 is provided with the maximum number of lighting modules 104 pre-attached. In such embodiments, the method of installing the lighting assembly 100 may include removing one or more lighting modules 104 that are not required for the particular installation. This may include removing one or more fasteners coupling the respective lighting module 104 to the base plate 102.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention. All patents and published patent applications identified herein are incorporated herein by reference in their entireties.

What is claimed is:

1. A lighting assembly comprising:
   a base plate;
   a first lighting module coupled to the base plate, the first lighting module comprising:
      a light source; and
      a housing supporting the light source, the housing comprising a first end adjacent the base plate, a second end spaced apart from the first end, and a first face and a second face extending from the first end toward the second end;
   wherein a first member and a second member of a ceiling grid are each t-shaped having a vertical portion and a horizontal portion extending along a length of the respective member,
   wherein the lighting assembly is configured to be coupled to the ceiling grid such that the light source is positioned above the horizontal portions of the first member and the second member and at an intersection of the first member and the second member,
   wherein the first face and the second face of the housing extend downward from the base plate toward the horizontal portions of the first member and the second member,
   wherein the housing of the first lighting module, at the second end, comprises a first flange extending outwards from a first face of the housing and a second flange extending outwards from a second face of the housing,
   wherein the first flange and the second flange are adjacent to one another, and
   wherein the first flange and the second flange are configured to be mounted at the intersection of the first member and the second member.

2. The lighting assembly of claim 1, wherein the base plate comprises four lighting module attachment elements and wherein four quadrants are defined by the intersection of the first member and the second member and, when coupled to the ceiling grid, one of the four lighting module attachment elements is positioned within each of the four quadrants.

3. The lighting assembly of claim 1, further comprising a second lighting module coupled to the base plate, the second lighting module comprising:

a light source; and
a housing supporting the light source and coupled to the base plate, the housing comprising a first end adjacent the base plate, a second end spaced apart from the first end, and a first face and a second face extending from the first end toward the second end;
wherein, when the lighting assembly is coupled to the ceiling grid:
the first face and the second face of the housing of the second lighting module extend downward from the base plate toward the horizontal portions of the first member and the second member, and
the first lighting module is on a first side of the vertical portion of the first member and the second lighting module is on an opposite side of the vertical portion of the first member.

4. The lighting module assembly of claim 3, further comprising a third lighting module coupled to the base plate, the third lighting module comprising:
a light source; and
a housing supporting the light source and coupled to the base plate, the housing comprising a first end adjacent the base plate, a second end spaced apart from the first end, and a first face and a second face extending from the first end toward the second end;
wherein, when the lighting assembly is coupled to the ceiling grid:
the first face and the second face of the housing of the third lighting module extend downward from the base plate toward the horizontal portions of the first member and the second member, and
the first lighting module is on a first side of the vertical portion of the second member and the third lighting module is on an opposite side of the vertical portion of the second member.

5. The lighting module assembly of claim 4, further comprising a fourth lighting module coupled to the base plate, the fourth lighting module comprising:
a light source; and
a housing supporting the light source and coupled to the base plate, the housing comprising a first end adjacent the base plate, a second end spaced apart from the first end, and a first face and a second face extending from the first end toward the second end;
wherein, when the lighting assembly is coupled to the ceiling grid:
the first face and the second face of the housing of the fourth lighting module extend downward from the base plate toward the horizontal portions of the first member and the second member,
the first lighting module is on a first side of the vertical portion of the first member and the fourth lighting module is on an opposite side of the vertical portion of the first member, and
the first lighting module is on a first side of the vertical portion of the second member and the fourth lighting module is on an opposite side of the vertical portion of the second member.

6. The lighting assembly of claim 1, further comprising at least one mounting bracket coupled to the base plate and configured to couple the lighting assembly to the vertical portion of at least one of the first member and the second member.

7. The lighting assembly of claim 1, further comprising a cover removably coupled to the base plate on a side of the base plate opposite the first lighting module.

8. The lighting assembly of claim 1, wherein the light source comprises one or more light emitting diodes.

9. The lighting assembly of claim 1, wherein the first flange and the second flange are perpendicular to one another.

10. The lighting assembly of claim 1, wherein the housing of the first lighting module further comprises a flange extending outward at the second end, the flange configured to at least partially support a ceiling tile.

11. The lighting assembly of claim 1, wherein the first face of the housing is configured to be parallel to the vertical portion of the first member and the second face of the housing is configured to be parallel to the vertical portion of the second member.

12. A lighting assembly comprising:
a base plate;
a first lighting module coupled to the base plate, the first lighting module comprising:
a light source; and
a housing supporting the light source; and
a second lighting module coupled to the base plate, the second lighting module comprising:
a light source; and
a housing supporting the light source;
wherein the first and second lighting modules are independently coupled to the base plate; and
wherein the lighting assembly is configured to be coupled to a ceiling grid such that the base plate is mounted above an intersection of a first member of the ceiling grid and a second member of the ceiling grid, with the first lighting module disposed on a first side of the first member and the second lighting module disposed on the opposite side of the first member.

13. The lighting assembly of claim 12, further comprising:
a third lighting module coupled to the base plate, the third lighting module comprising:
a light source; and
a housing supporting the light source;
wherein, when the lighting assembly is installed, the first lighting module is disposed on a first side of the second member and the third lighting module is disposed on an opposite side of the second member.

14. The lighting assembly of claim 13, further comprising:
a fourth lighting module coupled to the base plate, the fourth lighting module comprising:
a light source; and
a housing supporting the light source;
wherein, when the lighting assembly is installed, the first lighting module is disposed on a first side of the first member and the fourth lighting module is disposed on an opposite side of the first member, and
wherein, when the lighting assembly is installed, the first lighting module is disposed on a first side of the second member and the fourth lighting module is disposed on an opposite side of the second member.

15. The lighting assembly of claim 13, further comprising at least one mounting bracket coupled to the base plate and wherein the first member and the second member are each t-shaped having a vertical portion and a horizontal portion extending along a length of the respective member and the mounting bracket is configured to couple the lighting assembly to the vertical portion of at least one of the first member and the second member.

16. The lighting assembly of claim 12, wherein the housing of the first lighting module comprises a flange extending outward, the flange configured to partially support a ceiling tile.

17. The lighting assembly of claim 12, further comprising a cover removably coupled to the base plate on a side of the base plate opposite the first lighting module.

18. The lighting assembly of claim 13, further comprising an LED driver.

19. A lighting kit comprising:
- a base plate;
- a first lighting module configured to couple to the base plate, the first lighting module comprising:
  - a light source; and
  - a housing supporting the light source;
- a second lighting module configured to couple to a second lighting module attachment element of the base plate;
- a third lighting module configured to couple to a third lighting module attachment element of the base plate;
- a fourth lighting module configured to couple to a fourth lighting module attachment element of the base plate; and
- a cutting tool configured to create a recess in a ceiling tile configured to conform to the housing of the first lighting module.

20. A ceiling assembly comprising:
- a ceiling grid comprising:
  - a first member having a vertical portion and a horizontal portion extending along a length of the first member;
  - a second member having a vertical portion and a horizontal portion extending along a length of the second member, the first member and the second member intersecting at an intersection;
- a lighting assembly comprising:
  - a base plate;
  - a first lighting module coupled to the base plate, the first lighting module comprising:
    - a light source; and
    - a housing supporting the light source, the housing comprising a first end adjacent the base plate, a second end spaced apart from the first end, a first face and a second face extending from the first end toward the second end, a first flange extending outwards from the first face at the second end, and a second flange extending outwards from the second face, the first flange and the second flange being adjacent to one another; and
- at least one ceiling tile;
- wherein the lighting assembly is coupled to the ceiling grid such that the first flange and the second flange are configured to be mounted at the intersection of the first member and the second member,
- wherein the first face and the second face of the housing extend downward from the base plate toward the horizontal portions of the first member and the second member; and
- the at least one ceiling tile is supported by the horizontal portions of the first member and the second member and by the first flange and the second flange of the housing of the first lighting module.

\* \* \* \* \*

UNITED STATES PATENT AND TRADEMARK OFFICE
CERTIFICATE OF CORRECTION

| | | |
|---|---|---|
| PATENT NO. | : 10,859,242 B2 | Page 1 of 1 |
| APPLICATION NO. | : 16/266356 | |
| DATED | : December 8, 2020 | |
| INVENTOR(S) | : Robert Edwin McLaughlin, III et al. | |

It is certified that error appears in the above-identified patent and that said Letters Patent is hereby corrected as shown below:

In the Claims

Claim 18 should read:
The lighting assembly of claim 12, further comprising an LED driver.

Signed and Sealed this
Nineteenth Day of January, 2021

Andrei Iancu
*Director of the United States Patent and Trademark Office*